3,300,436
CASTING COMPOSITION FOR LIGHT
POLARIZING FILM
Alvin M. Marks and Mortimer M. Marks, both of
153—16 10th Ave., Whitestone, N.Y. 11357
No Drawing. Filed Dec. 11, 1962, Ser. No. 243,752
2 Claims. (Cl. 260—31.2)

This invention relates to casting compositions initially forming an amorphous polymer-complex which are transformable upon extension into a continuous crystalline film capable of strongly polarizing transmitted light.

This application is a continuation-in-part of an application for patent entitled, "Film Casting Composition and Method," filed December 15, 1958, by Alvin M. Marks, and Mortimer M. Marks, Serial No. 780,580, now abandoned.

The manufacture of polarizing films according to the prior art required four steps:

(1) A film comprising a high molecular weight linear polymer, such as polyvinyl alcohol, butyral, or the like, was stretch-crystallized;

(2) The stretch-crystallized film was processed by dipping it into a solution comprising iodine or other "polarizing substance" suitable for formation of a polarizer, imbibing the polarizing substance and solvent;

(3) The film processed according to (1) and (2) was dipped into a solution containing a crosslinking agent which was imbibed;

(4) The film processed as above was heated to eliminate solvents and to stabilize and insolubilize the crystalline film by reacting and crosslinking the complex.

To withstand the steps (2), (3) and (4), the film had to be adhered to a transparent support, or supported in a frame. The process (1), (2), (3) and (4) involved difficult control problems and was expensive.

The casting compositions of the present invention permit combining the three steps (1), (2) and (3) into one or two steps, and thereby enables low cost, large scale continuous production of polarizing film with relatively simple equipment involving minimal control factors.

A casting composition, according to this invention, comprises a combination of high and medium vapor pressure solvents, and a temporary plasticizer characterized by a low vapor pressure falling within a specific range hereinafter specified, having dissolved therein a linear high molecular weight polymer containing side reactive groups and a substance capable of inter-crystallizing therewith and polarizing light.

The use of solvents of relatively high and medium vapor pressure and a solvent having substantially lower vapor pressure, known as a "temporary plasticizer," enables the resulting amorphous cast film to be stretch-crystallized for the high speed low cost production of light polarizing materials.

The process of stretch-crystallization preferably employed, is known in the art as "cold drawing." By the term "cold draw" is meant a process of stretch-crystallization of a partially solidified self-supporting film, wherein the film under tension suddenly decreases in section (necks down and extends) over a very small distance while the nature of the film changes suddenly from the amorphous to the crystalline state.

The term "temporary plasticizer" as used herein is understood to mean a plasticizer which will remain in the casting solution, and the partially solidified film resulting therefrom, for a time interval sufficient to permit the deformation of the film, but which will subsequently evaporate so that the film may further solidify.

To stabilize the product against deformation and loss of polarizing properties, a crosslinking agent may be incorporated into the composition. Crosslinking agents tend to increase the viscosity of the casting solution and may cause gelling in the course of time. Hence it may be convenient to initially omit the crosslinking agent from the casting composition so as to extend its useful life. The crosslinking step may be performed by imbibing the crosslinking agent, as described in U.S. Patent No. 2,432,113, issued to Alvin M. Marks et al. Alternatively, the crosslinking agent may be present initially in the composition in a small amount, and the completion of the crosslinking may be performed as a subsequent step. In another case, the crosslinking agent may be present in the solution in an amount sufficient to permit a one-step process, exclusive of heating.

Accordingly, it is an object of the present invention to provide film casting solutions which, upon partial solidification, may be readily deformed to form light polarizing films and which will thereafter harden into stable self-supporting films.

Another object of the invention is to provide film casting solutions which will not retract following deformation or stretching and will maintain their molecularly aligned (crystalline) state after hardening.

A further object of the present invention is to provide stable film casting solutions which will not deteriorate in the presence of heat, humidity, or other ambient conditions to which they may be subjected.

Another object of the present invention is to provide film casting solutions which lend themselves to rapid, continuous film forming and stretching operations.

Another object is to provide film casting solutions which, upon partial drying, will remain in a stretchable state for a time interval sufficient to permit optimum orientation or crystallization by stretch and which will soon thereafter harden into a self-supporting stable film.

A feature of the present invention is the use of temporary plasticizers in the casting solution to maintain the cast film in such state as to facilitate and optimize the stretch-crystallization process, and to render controllable the time interval during which this process can best be performed.

Another feature of the present invention is to minimize the number of steps required in the manufacture of polarizing film, by combining constituents in a single casting composition, comprising a linear high molecular weight polymer, a dichroic material, and a temporary plasticizer, and optionally, a crosslinking agent.

Another feature of this invention is the use of an acid such as acetic acid, compatible as a solvent with all components of the casting composition, to facilitate the inter-crystallization of the iodine with the stretch-crystallized polymer, and its crosslinking.

Another feature of this invention is a casting composition using a vinyl resin such as polyvinyl butyral or polyvinyl alcohol dissolved in a solution containing alcohol and water, a dichroic material, a temporary plasticizer, and optionally a crosslinking agent.

Another feature of this invention involves the selection and control of the crosslinking step or steps.

Another feature of this invention is the selection and control of a subsequent deformation step useful in the lamination of polarizing film to concave or convex surfaces.

Still another feature of this invention is the selection and control of film adhesion to glass or plastic surfaces wherein a temporary bond, or a permanent intrinsic bond may be achieved between polarizing film and supporting surface, as required by the manufacturing process.

Other objects and advantages will become more apparent from the following detailed description of certain preferred embodiments hereof.

To manufacture light polarizing films from solutions made according to this invention, the casting solution is uniformly spread or coated upon a casting surface. The high and intermediate vapor pressure solvents present in the solution evaporate until the coating is partially solidified, that is, until there results a self-supporting amorphous film containing an optimal proportion of temporary plasticizer, such that, upon stretch-crystallization the film has the highest degree of orientation or crystallization. The partially solidified amorphous film may also contain a crosslinking or stabilizing component which has not fully reacted at this stage. The partially solidified amorphous film is then stretch-crystallized by extension. Pulling the partially solidified film from the casting surface at an angle of the order of 0.1 to 10°, causes an extension of the film to between 8 and 5 times the initial length, and a decrease in thickness and width.

Particularly when iodine is used as a polarizing substance intercrystallization with the stretch-crystallized polymer occurs more readily at lower temperatures, and in such case it is preferable to perform the stretch-crystallization step at a controlled room temperature. If higher temperatures are employed however, a smaller proportion of temporary plasticizer may be employed.

The temporary plasticizer evaporates gradually at room temperature, or more rapidly at elevated temperature. The evaporation of temporary plasticizer causes the crystallized polymer, polarizing substance, and crosslinking substance, if present, to pack more tightly together, to form an integral stable continuous crystal.

Acetic acid is a mutual solvent for ethanol, iodine, polyvinyl butyral, and butyl lactate, which are components of the specific examples set forth herein. Acetic acid also has the advantage of causing the iodine to intercrystallize with the crystalline film to form a film capable of polarizing light. Acetic acid also facilitates the crosslinking reaction involving silica, when present.

The stretch-crystallized film thus formed lends itself well to a wide variety of processes for the manufacture of polarizing products. It may be supported temporarily or permanently by adhesion or self-adhesion with or without an intrinsic bond to a supporting surface, or the film may be kept taut and flat while unsupported over an area by means of a ring support, or a perforated supporting web.

To apply the light polarizing films formed from the casting solution set forth in the examples, to a convex or concave surface of 4, 6 or more diopters, it is necessary to further deform the film to assume the shape of the curved surface. If this step be performed soon after the stretch-crystallization step, then the temporary plasticizer present in the film at this stage, is usually adequate for such deformation. The polarizing film which contains temporary-plasticizer, is self-adhesive by contact to glass or plastic surfaces. Stabilization and intrinsic adhesion of the polarizing film to the surface may be achieved by a permutoid imbibition of a silicate solution, followed by subsequent heating.

After the stretch-crystallization and lamination steps, the supported film is further dried, for example at a temperature of 50°–70° C., to drive off the temporary plasticizer and to consolidate and compact the crystal structure.

Subsequently the polarized lenses are treated with stabilizing solution and heated.

By this process large areas of film may be simultaneously gang-laminated to many lenses. These steps may be performed continuously while the polarized lenses are attached to a travelling web, all operations being performed automatically as successive steps on one machine. One machine may thus conveniently cast, partially dry, stretch-crystallize, deform and laminate polarized film to lenses, and stabilize, heat and finish the resulting polarized lenses in quantity.

If the film is deposited upon a support such as a cellulose acetate film just after stretch-crystallization, and dried, it will adhere permanently with a weak electrostatic bond. This assembly forms a strippable polarized film upon a support capable of indefinitely long storage without deterioration. The strippable polarized film may be subsequently transferred and laminated to glass or plastic in flat sheets, or further deformed after first adhering the polarized film to a ring or a web which presents a central unsupported film area. This central film area may again be softened, for example, with a suitable softening solution, and then subsequently further deformed and adhered to concave or convex surfaces, dried by heating, stabilized and heated again.

An example of a temporary plasticizer, which has proven highly satisfactory for use in casting solutions of the present invention, is butyl lactate.

Other examples of temporary plasticizers suitable for use with constituents such as iodine and polyvinyl butyral, polyvinyl acetal, and the like, are solvents having a low vapor pressure, such as: ethyl lactate, diacetone alcohol, cyclohexanol, amyl acetate, glycolmonoethyl ester acetate or the like. Properties of solvents suitable for use as "temporary plasticizers" are given in Table III.

In contrast to temporary plasticizers we prefer not to employ permanent plasticizers which may tend to cause disalignment of the crystalline structure. Permanent plasticizers may be defined as solvents of very low vapor pressure (less than 0.1 mm. Hg at 20° C.) which have extremely small evaporation rates, or which evaporate substantially not at all. Examples of permanent plasticizers are the dialkyl phthalates.

In a copending application, Serial No. 799,764, as well as in U.S. Patent No. 2,897,544, issued August 4, 1959, to Alvin M. Marks, we disclose a plasticizing agent, glycerol, which aids in the stretch-crystallization of a polyvinyl alcohol or polyvinyl alcohol-acetate copolymer.

Because of its low vapor pressure, 0.05 mm. Hg at 20° C., glycerol may be characterized as a permanent plasticizer. It remains permanently in the polarizing film. Glycerol has reactive side and terminal hydroxyls capable of forming glycerol silicate, or crosslinking with the side reactive groups of the polymer. It thus becomes a permanent component of the stretch-crystallized matrix along with the polyiodine and silica.

Plasticizers which can enter into a reaction which will permanently affix them to the matrix, may thus be employed. However, the temporary plasticizer concept herein disclosed, has been found to offer certain advantages of control and flexibility in the manufacturing process. For example, the temporary plasticizer may be removed and replaced at a subsequent time and place.

Examples of film casting compositions which are suitable for the production of light polarizing films according to this invention, are as follows:

SOLUTION A¹

|  | Solution | Solids |
| --- | --- | --- |
| Butyl lactate | 1,100 |  |
| Ethanol | 1,190 |  |
| Acetic acid | 6,000 |  |
| Polyvinyl butyral | 760 | 760 |
| Total | 9,050 | 760 |

In order to prepare Solution A¹, all of the liquids are added at room temperature and stirring is commenced. The plastic powder is added and stirring is continued until all of the plastic powder has dissolved.

SOLUTION B¹

|  | Solution | Solids |
| --- | --- | --- |
| Iodine re-sublimed | 20 | 20 |
| Ethanol | 80 |  |
|  | 100 |  |

Heat Solution B¹ to 60°–70° C. for about 4 hours, stir for 10 minutes, and then cool to about 20° C.

The casting composition A¹B¹ is formulated as follows:

Add "B¹" to "A¹" in the following proportions and stir:

| Formula No. | A¹B¹ | |
| --- | --- | --- |
| | Solution | Solids |
| Total Solution A¹ | 9,050 | 760 |
| Total Solution B¹ | 950 | 190 |
| Total A¹ and B¹ | 10,000 | 950 |
| Percentage of total solids | | 9.5 |
| Percentage of iodine in solid | | 20.0 |

Upon applying the Solution A¹B¹ in the form of a coating to a casting surface, and after the Solution A¹B¹ has partially dried, only the temporary plasticizer butyl lactate remains along with the final solid composition. The partially solidified film is now ready for stretch-crystallization, the following then being the approximate composition:

TABLE I.—PARTIAL SOLIDS COMPOSITION OF SOLUTION A¹B¹ DURING STRETCH-CRYSTALLIZATION STEP

| | Partial Solids | Percent | |
| --- | --- | --- | --- |
| Butyl Lactate | 1,100 | 53.6 | Temporary Plasticizer. |
| Polyvinyl Butyral | 760 | 46.4 | Final Solids. |
| Iodine | 190 | | |
| Total | 2,050 | 100.0 | |

The composition given in Table I is considered approximate, since either some intermediate solvent may remain, or some of the temporary plasticizer may have already evaporated. However, this will serve to illustrate the nature of the "mechanism" resulting from the employment of a "temporary plasticizer."

Combinations of temporary plasticizers may be advantageously employed. For example, we may employ a combination comprising diacetone alcohol and butyl lactate. The increased evaporation rate of the combined temporary plasticizer relative to that of butyl lactate, provides for a more rapid evaporation and solidification of the polarizing film.

An example of a casting solution of this type follows:

SOLUTION A²B²

| | Solution | Solids |
| --- | --- | --- |
| Solution A²: | | |
| Butyl Lactate | 780 | Temporary Plasticizer |
| Diacetone Alcohol | 620 | (1,400) |
| Ethanol | 980 | |
| Acetic Acid | 5,280 | |
| Water | 430 | |
| XYSG (Polyvinyl butyral high molecular weight) | 920 | 920 |
| Total Solution A² | 9,010 | |
| Solution B²: | | |
| Ethanol | 780 | |
| Iodine | 200 | 200 |
| Lithium Iodide LiI.3H₂O | 10 | 10 |
| Total Solution B² | 990 | |
| Total Solution A²B² | 10,000 | Total 1,130 Final Solids. |
| | | Total 2,530 Partial Solids. |
| Percent Solids | 11.3 | |
| Percent I in Final Solids | 17.7 | |
| Percent Temporary Plasticizer | 55.3 | In Partial Solids. |
| Percent Temporary Plasticizer | 14 | In Total Solution. |

The solvent compositions of A¹B¹ and A²B² may be modified by the substitution in whole or in part, of various fast and intermediate solvents such as those shown in Table II.

Tables II and III list and compare the properties of the various solvents. Compatible solvents having equivalent properties may be substituted to produce suitable casting compositions according to this invention.

*Symbols*

$P_{20}$ = vapor pressure of solvent in mm. Hg at 20° C.

$t$ = time in hours for a given thickness of the pure solvent to evaporate under standard test conditions.

TABLE II.—SOLVENTS HAVING FAST TO INTERMEDIATE EVAPORATION RATE

| Solvent | Vapor Pressure, $P_{20}$, mm. Hg | Evaporation Rate | |
| --- | --- | --- | --- |
| | | Relative Time, $t$ hours | Designation |
| Freon 113 ($C_2F_3Cl_3$) | 272.8 | 0.3 | Fast. |
| Methanol | 96.9 | 1.3 | Do. |
| Ethanol | 43.6 | 2.3 | Do. |
| Iso-propanol | 33.0 | 2.6 | Intermediate. |
| n-propanol | 12.4 | 7.0 | Do. |
| Acetic Acid | 11.4 | | Do. |

The casting solutions of this invention contain suitable "fast" or "intermediate" solvents, examples of which are listed in Table II, together with their vapor pressures and relative evaporation time. The casting solutions A¹B¹ and A²B² contain "intermediate" and "fast" solvents having vapor pressures of 11.4–43.6 mm. Hg respectively at 20° C. When such a casting composition is spread upon a casting surface, the "fast" and "intermediate" solvents leave the coating first, and the temporary plasticizer such as butyl lactate is retained for a longer time in the cast coating. Butyl lactate has a vapor pressure of only 0.4 mm. Hg at 20° C. (1 to 3% of the vapor pressure of a "fast" solvent such as ethanol). The casting composition has been so formulated that just the right proportion of "temporary plasticizer" (butyl lactate) remains in the polarizing film after substantially all of the higher vapor pressure components have evaporated. Thus we provide the precise proportions of solvent lubrication for the optimal stretch-crystallization of the partially solidified cast film.

The temporary plasticizer is also important in that it controls the time interval available for the stretch-crystallization step. The stretch-crystallization must occur at such a time that the proportion of solvent which remains between the chains is such as to optimally lubricate the chains in their extension from the random orientation of the amorphous state into a parallel alignment which enables the chains to become organized into the crystalline state. If there is little or no solvent present in the cast film (up to 50% by weight of solids), the film may be too hard, and the film will not stretch-crystallize, but instead will tear under tension. If there is too much solvent present in the film cast (over 150% by weight of solids), the film may be too soft, and the cast film may instead stretch with little or no alignment, or pull apart if not self-supporting. If the film contains too much solvent and even if the polymer chains are momentarily drawn parallel by the stretching process, they may be too free to move, and will disalign. An optimum proportion of solvent required for stretch-crystallization lies between these limits, which in the case of the examples herein given, comprises about $x=50$ to 60 parts solvent (temporary plasticizer) to $(100-x)$ parts of final solids. However, the proportion of temporary plasticizer used may vary within and outside of these limits, with the composition of the solid components of the casting composition, and with the temperature during the stretch-crystallization step.

The partially solidified film may optimally undergo the stretch-crystallization step within a certain time period, which may, for example, vary from 0.1 to 10 minutes after the initial drying of the partially solidified casting solution. Thus, the use of temporary plasticizer enables the predetermined choice and control of the optimum proportion of solvent relative to final solids during the stretch-crystallization step and its timing.

The temporary plasticizer is eventually substantially eliminated by evaporation after the stretch-crystallization step. The rate at which the temporary plasticizer is eliminated from the stretch-crystallized film is a function of time and temperature. After the stretch-crystallization step, it is preferred to heat the stretch-crystallized film which then contains the temporary plasticizer, to substantially completely eliminate the temporary plasticizer by evaporation. This will occur with films prepared from Solutions $A^1B^1$ and $A^2B^2$ in for example, 5 to 15 minutes at 50°–70° C.

If the film is not immediately heated, the temporary plasticizer usually gradually escapes almost completely in hours. However, the presence for an extended time interval of an interstitial solvent such as a temporary plasticizer may cause a decrease in the alignment and perfection of the crystal structure due to an increase in the mobility of the polymer chains.

It is important to quickly compact the polymer chains by solvent evaporation, and to thus rapidly perfect and stabilize the crystallized structure by elimination of substantially all solvent therefrom. Hence it is preferred to heat the polarizing film as soon as possible after the stretch-crystallization step.

A requirement for the temporary plasticizer is that it be compatible with all components, and result in a clear polarizing film.

Another requirement for the temporary plasticizer is that its vapor pressure fall within a given range, say between 0.1 and 10.0 mm. Hg at 20° C., but preferably between 0.2 and 4.0; and preferably between 10 and 400 hours on the relative evaporation time scale shown in Table III. The values given for evaporation time refer only to the time required to evaporate a given thickness of a pure solvent. The values of evaporation time have no bearing on actual evaporation times of the same solvent from a very thin polarizing film. However, values of relative evaporation time given in the tables are useful for comparison of one solvent with another.

For "temporary plasticizers" useful in the casting compositions herein disclosed, various chemical classes, such as esters, alcohols and polyols, ether-alcohols, ethers and polyethers, ketones, nitrocarbons, or chlorocarbons may be substituted for butyl lactate and diacetone alcohol, if they conform to the criteria herein.

The "slow" and "very slow" solvents listed as temporary plasticizers in Table III are illustrative. Other classes, and other solvents within such classes may be used as temporary plasticizers without departing from the scope of this invention.

Properties and general class of various solvents suitable as "temporary" plasticizers are given in Table III which follows:

TABLE III.—TEMPORARY PLASTICIZERS

| Solvent | Class | Vapor Pressure, $P_{20}$, mm. Hg | Relative Evaporation Time | |
|---|---|---|---|---|
| | | | $t$ hours | Designation |
| Butyl Lactate | (a) | 0.4 | 310 | Very slow. |
| Diacetone Alcohol | (d) | 1.0 | 55 | Do. |
| "Cellosolve Acetate" Glycol Monoethyl Ester Acetate. | (a) | 1.2 | 45 | Do. |
| Cyclohexanol | (b) | 3.4 | 100 | Slow. |
| "Cellosolve" 2 Ethoxy Ethanol | (c) | 3.8 | | Do. |
| Ethyl Lactate | (a) | | 33 | Do. |
| Amyl Acetate | (a) | 8.8 | 22 | Do. | a Ester.  b Alcohol.  c Ether-alcohol.  d Ketone.

While the compositions set forth above have been given by way of example, it will be understood that the percentage of acetic acid employed may vary from 0 to 60 parts, that the butyl lactate may be varied from 5 to 15 parts by weight, the ethanol from 0 to 30 parts by weight, the polyvinyl butyral from 4 to 12 parts by weight, and the iodine from 1 to 3 parts. In the compositions set forth above, Solution $A^2B^2$, the butyl lactate may be present in from 6 to 9 parts by weight, the diacetone alcohol from 5 to 7 parts by weight, from 1 to 10 parts by weight of water may be present, from 5 to 20 parts by weight of ethanol, from 0 to 60 parts by weight of acetic acid, from 4 to 12 parts by weight of polyvinyl butyral and from 1 to 3 parts by weight of iodine.

In addition, the lithium iodide called for in Solution $B^2$ may range from ¼ to 3 parts by weight.

Concerning the crosslinking step, we have found that certain chemicals which are bi-functional, tri-functional or quadri-functional, and which contain groups capable of cross-linking with the reactive side groups of the polymer, or which induce crosslinking of the reactive side groups, will serve as crosslinkers or stabilizers. Among the diverse materials discovered as effective are (poly-) phosphoric acid, 2,2′, 4,4′ dihydroxy benzophenone, and certain metallic iodides such as lithium iodide, $LiI \cdot 3H_2O$. These may be dissolved to comprise 0.5 to 5% by weight of final product solids in casting Formulae $A^1B^1$ or $A^2B^2$. Hydrochloric acid tends to induce crosslinking among reactive side groups, such as hydroxyl groups.

We have found it convenient to dissolve these materials in Solution B and then to add Solutions A and B as before.

Other crosslinking agents such as boric acid and borax are known in the art but have proven less effective with Formulae $A^1B^1$ or $A^2B^2$.

The crosslinking agents 2,2', 4,4' dihydroxy benzophenone and (poly-) phosphoric acid contain at least two double bonded oxygens per molecule, which are effective as crosslinking agents. The bonding strength of such crosslinking reactions is similar to that of lithium iodide. These crosslinking agents are preferably followed with the final silica crosslinking step which forms a much stronger bond.

The lithium iodide is the preferred initial stabilizer. Lithium compounds have the property of forming weak secondary linkages which are particularly suitable for use as an initial crosslinking agent. A casting solution such as $A^2B^2$, which contains approximately 1% lithium iodide by weight of final solids dissolved therein, may be coated on the casting belt several hours after preparation, without excessive viscosity change or gelling. Polarizing film from Formula $A^2B^2$ may be subsequently further crosslinked with silica, to form a highly stable polarizing film adhered intrinsically to glass or plastic. The product resulting from the incorporation of an initial stabilizer (lithium iodide, etc.) and a final stabilizer (silica) is very much more stable than products resulting from either stabilizer used alone.

With respect to lithium iodide, not only does the lithium iodide tend to crosslink through its secondary bonds, but it is capable of terminating polyiodide chains so that iodine cannot escape from the crystallized regions to the amorphous regions of the film. Moreover, there is some evidence that the lithium is capable of forming a part of the polyiodide chain resonating in the following manner:

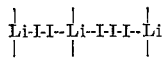

In this way the lithium partakes in the polarizing action as well as increases the stability of the product.

The above is substantiated by the product being more neutral due to a lack of free iodine in the structure, the product having time stability at, for example, 100° C., or about 30 times that of the product without the lithium iodide.

In casting compositions which contain a high percentage of silica, however, timing must be strictly controlled. The time between the preparation of the casting solution and its coating upon the casting belt; the time for drying of the coating on the casting belt until partially solidified sufficiently to be stretch-crystallized; and the time during which the stretch-crystallized polymer complex may be applied to flat or curved surfaces of sheet or lenses and directly adhered to such surfaces; must be precisely controlled. If such a controlled process is utilized, steps 1, 2 and 3 are now combined into a single step, and the adhered iodoalkane silicate polarizer merely requires heating to drive off the residual solvents, and to react and solidify the polarizing crystalline complex, which has intrinsic adherence to glass and various plastics.

In certain cases, it is advantageous to separate step 3 from steps 1, 2 and 3 in the above process. The casting formulae of the present invention provides such flexibility.

In a process according to this invention, a strippable polarized film is produced which may be stored for an indefinite time period. The adhesion of the film to flat or curved surfaces may be accomplished subsequently at any later time or place.

In the case of water soluble polymers 50 to 150 parts by weight of compatible temporary plasticizers may be used. For example, with polyvinyl alcohol, the temporary plasticizer in this case may be "cellosolve"

$$(C_2H_5OC_2H_4OH)$$

which has a vapor pressure of 3.7 mm. Hg at 20° C.

From the foregoing it will be seen that there have been provided casting compositions suitable for forming upon partial drying films which may be extended and thereby crystallized to form light polarizing materials. The cast films are capable of a wide variety of manufacturing operations and lend themselves to continuous manufacture. Extremely thin light polarizing films can be produced from the casting solutions set forth herein with a resulting economy in manufacture and handling. Because of the versatility of the compositions, they can be regulated with respect to their drying rates to conform to a continuous manufacturing operation cycle. The compositions produce polorizing films of high efficiency, optical uniformity and high percentage of transmitted polarized light.

Having thus fully described the invention, what is claimed as new and desired to be secured by Letters Patent of the United States is:

1. A casting composition for producing light polarizing film consisting essentially of a linear high polymer vinyl resin having the property of crystallizing when oriented by stretch, and iodine a material having the property of imparting light-polarizing properties to oriented vinyl resins which comprises a total solution of 10,000 parts of the order of (a) 1400 parts temporary plasticizer (b) 920 parts vinyl resin (c) 200 parts iodine and 10 parts lithium iodide a crosslinking agent: the temporary plasticizer having a vapor pressure at 20° C. between about 0.1 mm. and about 10 mm. of mercury, said temporary plasticizer being present in amount from 60 to 120% by weight of the total solids in said solution; and (d) a volatile solvent having a vapor pressure of 20° C. in excess of 10 mm. of mercury, said volatile solvent comprising the balance of said solution.

2. An article of manufacture comprising from 4 to 12 parts of a high molecular weight linear polymer containing hydroxyl groups, from 2 to 3 parts iodine and from .0025 to .039 part of lithium iodide.

References Cited by the Examiner

UNITED STATES PATENTS

| 2,328,219 | 8/1943 | Land | 260—73 |
| 2,432,113 | 12/1947 | Marks et al. | 260—31.2 |
| 2,481,189 | 9/1949 | Barnes | 260—31.2 |
| 2,612,079 | 9/1952 | Mahler | 260—41 |
| 2,897,127 | 7/1959 | Miller | 260—91.3 |

OTHER REFERENCES

Simonds et al.: "Handbook of Plastics," D. Van Nostrand Co., Inc., 2nd ed., 1949, pp. 322–325.

Doolittle: The Technology of Solvents and Plasticizers, John Wiley & Sons, Inc., 1954, pp. 169, 580.

Smith: Vinyl Resins, Reinhold Publishing Corporation, 1958, pp. 51–52.

MORRIS LIEBMAN, *Primary Examiner.*

L. T. JACOBS, *Assistant Examiner.*